Nov. 28, 1967
C. J. AMMONDSON
3,354,509
BARBELL MOLD
Filed June 1, 1965
2 Sheets-Sheet 1
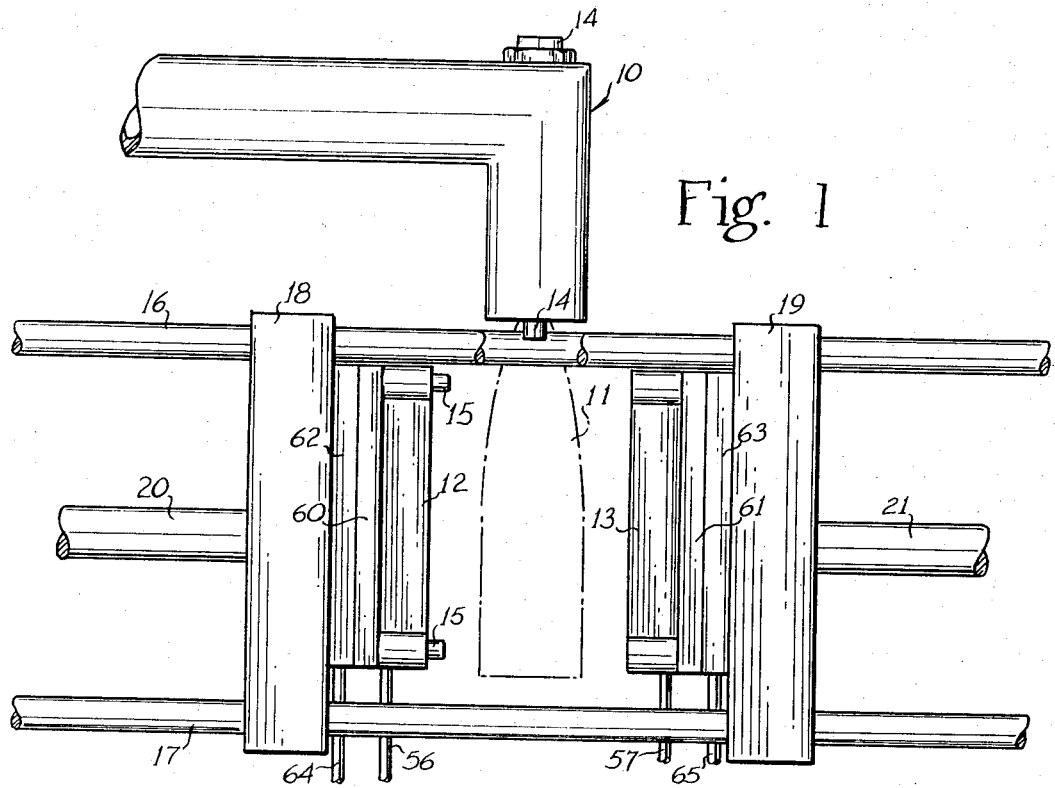
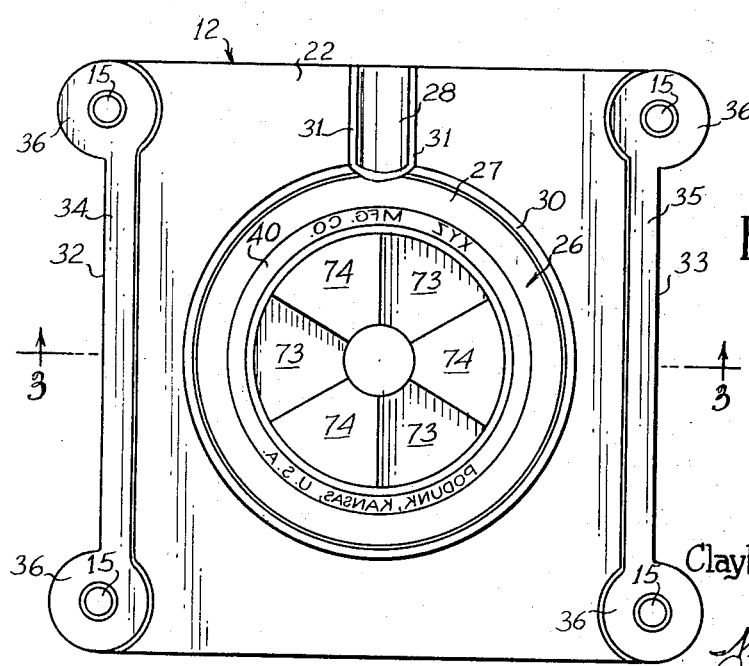
INVENTOR
Clayton J. Ammondson
BY Newton, Hopkins, Jones & Ormsby
ATTORNEYS Nov. 28, 1967  C. J. AMMONDSON  3,354,509
BARBELL MOLD
Filed June 1, 1965  2 Sheets-Sheet 2
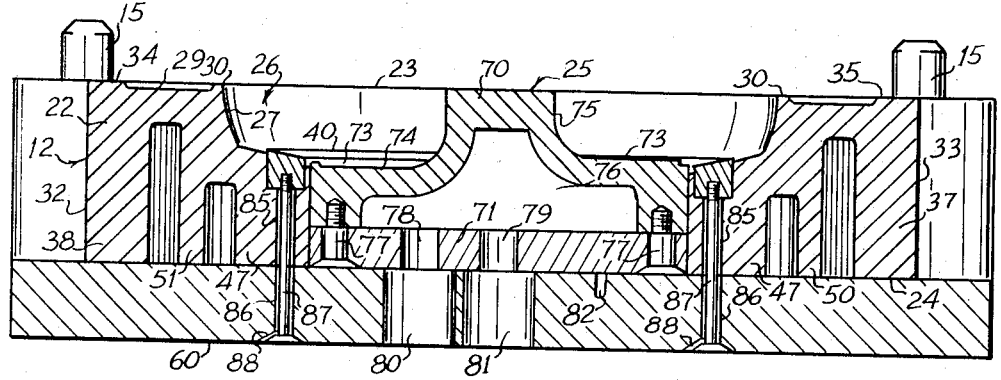
Fig. 3
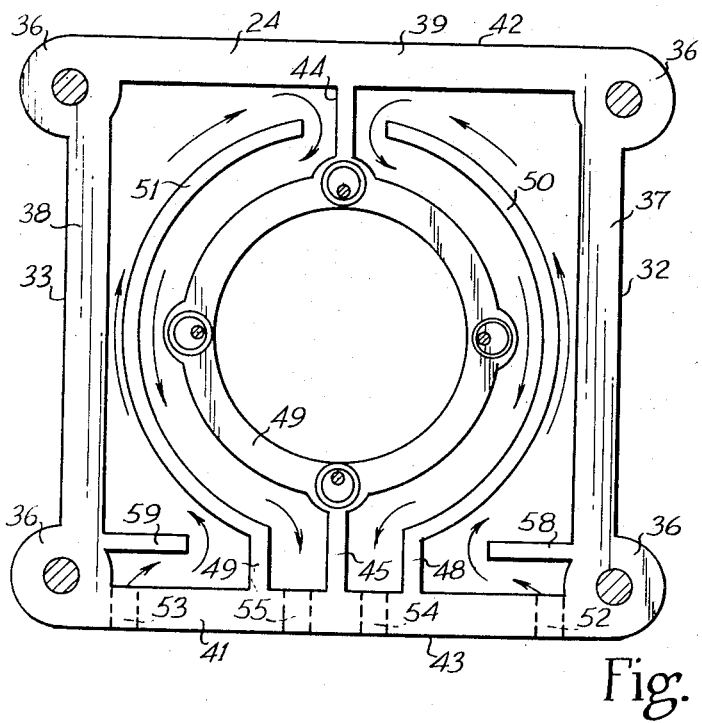
Fig. 4
Fig. 5
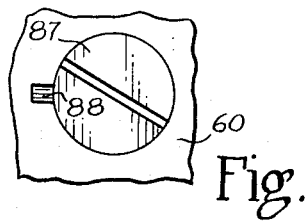
Fig. 6
INVENTOR
Clayton J. Ammondson
BY Newton, Hopkins,
Jones & Ormsby
ATTORNEYS United States Patent Office 3,354,509
Patented Nov. 28, 1967

3,354,509
BARBELL MOLD
Clayton J. Ammondson, Reidsville, N.C., assignor to Diversified Products Corporation, Opelika, Ala., a corporation of Alabama
Filed June 1, 1965, Ser. No. 460,440
6 Claims. (Cl. 18—35)

ABSTRACT OF THE DISCLOSURE

A mold for blow molding plastic shells for barbell weights, including a pair of die blocks movable toward and away from each other defining casting cavities, and each including removable interlock inserts and annular engraving rings.

Background of the invention

In the past, blow molding of plastic materials so as to provide hollow interiors therein has been widely used. Specifically, such blow molding techniques have been applied for producing plastic shells within which an aggregate material is inserted so as to produce weights for barbell sets, the filling holes of the shells being closed by plugs, after the aggregate material has been inserted into the hollow portions of the shells. U.S. Design Patent No. 197,726 discloses the type of weight for which such plastic shells are produced. In the aforesaid design patent, it will be noted that the central portion of the disc is provided with an interlock system of radially spaced lands or protrusions which are separated by grooves or valleys, circumscribing the central hole of the weight. U.S. Patent No. 3,171,652 also discloses a weight for a barbell formed by a plastic shell within which is inserted aggregate material which is solidified.

It has been general practice, in the past, to manufacture identically shaped discs which have different legends or indicia on the side walls thereof, using different molds. For example, if such discs are sold under separate trademarks, a separate mold was required for each size disc which bore that trademark, while other sets of molds were required for producing substantially identical discs with a different trademark thereon. The matter was further complicated by the fact that if the interlock around the central portion of the disc was changed, a separate mold was required for each type disc with a different type of interlock. Quite obviously, such a multiplicity of molds added to the cost of manufacturing the shells and added to the labor required when it was necessary to alter the surface of the disc.

In the blow molding of the disc, if the air could not readily escape from the mold, the surface of the disc had a rough appearance which, though not unsightly or unsaleable, did not present as smooth an appearance as could be obtained.

Summary of the invention

Briefly, the present invention obviates the difficulties described above by providing a mold for the blow molding of the plastic disc wherein the elements of the mold can be interchanged so as to provide for different legends on the side walls of the plastic discs and so as to provide for different interlock arrangements in the central portion of the plastic disc. At the same time, the mold is so arranged that air may readily escape therefrom.

Accordingly, it is an object of the present invention to provide a mold for the molding of hollow discs, wherein the legends imported to the discs may be readily and easily changed as desired.

Another object of the present invention is to provide a mold for the blow molding of a plastic disc wherein the interlock system of the resulting plastic disc may be readily and easily altered for successive discs.

Another object of the present invention is to provide a mold for the blow molding of a plastic disc which would impart to the resulting disc a smooth uniform outer surface.

Another object of the present invention is to provide a mold for the blow molding of a plastic disc wherein the elements defining the configuration of the outer surface may be readily and easily altered.

Another object of the present invention is to provide a mold for the blow molding of a plastic disc, the mold being inexpensive to manufacture, durable in structure and efficient in operation.

Other objects, features, and advantages of the present invention will become apparent from the following description, when taken in conjunction with the accompanying drawings wherein like characters of reference designate corresponding parts throughout the several views.

Brief description of the drawing

FIG. 1 is a fragmentary side elevational view of a blow molding machine carrying the mold of the present invention;

FIG. 2 is a front elevational view of one of the dies of the mold of the present invention;

FIG. 3 is an enlarged cross-sectional view taken substantially along line 3—3 in FIG. 2;

FIG. 4 is a rear elevational view of the die illustrated in FIG. 2;

FIG. 5 is an enlarged cross-sectional view of a portion of the mechanism illustrated in FIG. 3; and FIG. 6 is an enlarged view of one end of that portion of the mechanism illustrated in FIG. 5.

Description of an embodiment

Referring now in detail to the embodiment chosen for the purpose of illustrating the present invention, it being understood that in its broader aspects, the present invention is not limited to the exact details herein depicted, in FIG. 1, the conventional blow molding machine includes a nozzle denoted generally by numeral 10 through which a plastic material such as polyethylene is passed, being discharged in a downwardly direction as a tubular member or plastic parison 11. It will be understood by those skilled in the art that the polyethylene or other plastic material is in a heated condition and therefore can be blown against the walls of the mold or die segments 12 and 13 by means of compressed air which is introduced through an air nozzle 14 carried by the plastic nozzle 10.

Since the mold or die segments 12 and 13 are essentially complementary, only the die segment 12 is illustrated in FIGS. 2, 3, 4, and 5, it being understood that the die element 13 is identical thereto, with the exception of having holes for receiving the alignment pins 15 of the die segment 12.

The conventional blow molding machine also includes a plurality of horizontally disposed tie bars 16 and 17 on which are slidably carried the opposed platens 18 and 19, the platens 18 and 19 being moved inwardly toward each other and then outwardly by means of hydraulic cylinders (not shown) which drive the piston rods 20 and 21, connected to the platens 18 and 19. While it is usual for the platens 18 and 19 to carry a plurality of die segments, such as segments 12 and 13, only a single cavity mold or die is illustrated.

Referring specifically to FIGS. 2 through 6, the die segment 12 includes an outer or main die block 22 which has a flat inner or front surface 23 and a flat outer or back surface 24. The central portion along the axis of the main die block 22 is provided with a central circular hole which receives therein the interlock insert 25 which will be described in more detail, hereinafter.

Outwardly of the central hole, the main die block 22 is machined along its front surface 23 to provide an annular main casting cavity 26 concentric with, surrounding and communicating with the central hole therein, the casting cavity 26 being defined, in part, by a concaved annular mold surface 27. As seen in FIG. 2, the main casting cavity 26 communicates with a semi-cylindrical sprue 28 at its upper end portion.

Outwardly of the casting cavity 26 and the sprue 28, the main die block 22 is machined to a shallow depth to provide a flat face surface 29, offset but parallel to the front surface 23. The face surface 29 and the mold surface 27 define therebetween a pinching ring or shoulder 30 which merges with the parallel walls 31 of sprue 28. The function of the pinching ring 30 and the walls 31 is to seal and pinch tightly together the plastic material of parison 11.

Adjacent the vertical sides 32 and 33 of block 22, the face surface 29 terminates to define, outwardly thereof, a pair of spaced straight parallel shoulders 34 and 35. Hence, a pinch pocket between the main portion of the mold and the sides thereof is provided so that any excess plastic material on the outside of the mold may freely fall by gravity away from the mold.

The corners of the main die block 22 are cylindrically shaped so as to define corner cylinders 36 which receive therein, the protruding dowels or alignment pins 15. The pins 15 mate with and are received in bushings (not shown) in the complementary die segment 13 when the mold is closed.

Adjacent the central hole of the main die block 22, the mold surface 27 is further machined to provide an annular groove which removeably receives therein the engraving ring 40.

Since the die segments 12 and 13 are to be continuously cooled, suitable passageways for the liquid coolant must be provided. Therefore, the back side of the main die block 22 is machined to define, as illustrated in FIG. 4, a perimetrical border having vertical shoulders 37 and 38 adjacent sides 32 and 33, and horizontal shoulders 39 and 41 adjacent the upper edge 42 and adjacent lower edge 43 of the main die block 22, respectively. The ends of shoulders 37, 38, 39, and 41 terminate at and integrally join the corner cylinders 36.

Projecting inwardly along the vertical centerline, from the shoulders 39 and 41, are the partition members 44 and 45 which terminate in and merge with a central partition ring 47 surrounding the central hole of the main die block 22. On opposite sides of the partition 45 and leading from the shoulder 41 are a pair of side partitions 48 and 49, the inner ends of which merge with the ends of semi-circular passageway partitions 50 and 51. The passageway partitions 50 and 51 are concentric with and spaced outwardly from the central partition ring 47 and their upper ends terminate in spaced relationship to the upper partition 44. Hence communicating inner and outer passageways are provided on each side of partitions 44 and 45.

Openings 52, 53, 54 and 55 in the bottom edge 43, provide ports for receiving nipples (not shown) to which the coolant hoses 56 and 57, seen in FIG. 1, are attached. Liquid coolant, such as water, is introduced through the openings 52 and 53 into the coolant passageways and out of the openings 54 and 55. Inwardly of the openings 52 and 53, are baffles 58 and 59 which direct the flow of the coolant inwardly immediately after the coolant enters the passageways defined by the various partitions described above.

For closing the coolant passageways, a backing plate 60 is affixed to the back surface 24 of the main die block 22. A similar backing plate 61 is provided for the mold segment 13. Behind the backing plates 60 and 61 are the bolster plates 62 and 63 which are fixed to the platens 18 and 19. Coolant hoses 64 and 65 communicate with passageways (not shown) in the bolster plates 62 and 63 for purposes to be described hereinafter.

Referring now to the interlock insert 25, it will be remembered that one of the objects of the present invention was to be able to change interlock configurations for successive plastic shells. The removable interlock insert 25 enables one to readily change the interlock structure of the plastic shells to be produced. For this purpose, I recommend that a number of interlock inserts 25 be produced so that one may be substituted for the other, as desired. Each interlock insert 25 comprises a face plate 70 and a back plate 71. The face plate 70 can be on any one of a wide variety of configurations along its surface; however, in the present embodiment, by way of illustration, a three segment interlock is illustrated. This means that three evenly spaced, pie-shaped raised areas 73, separated by three lower areas 74 are circumferentially disposed around the cylindrical center post 75 of the face plate 70. The center post 75, however, stands above the radiating areas 73 and 74 and has a flat outer surface terminating in the same plane with the surface 23. The back portion of the face plate 70 is of larger diameter than post 75 and is snugly received in the central hole of die block 22.

The inner surface of face plate 70 is flat; however, the central back portion of the face plate 70 is recessed to define a coolant cavity 76 which is closed by the back plate 71, the back plate 71 being bolted against the back surface of the face plate 70 by bolts 77.

Ports 78 and 79 through the back plate 71 are aligned with ports 80 and 81 in the backing plate 60 and communicate with passageways in bolster plate 62. Hence, ports 78 and 79 communicate with hoses 67 and therefore, liquid coolant may be circulated to face plate 70.

Each interlock insert 25 is provided with a dowel pin 82, which is received in the backing plate 60. Therefore, proper alignment of ports 78 and 80 are assured. The insert 25 may, neverthelesss, be removed from the front, without tools, so that another insert may take its place.

The engraving ring 40 has a suitable outer surface 82, seen in FIG. 5 on which an appropriate legend is engraved for imparting a trademark or other written information to the walls of the discs to be produced. The ring 40 in cross-section, as seen in FIG. 5, is chambered at numerals 83 and 84. Also there is approximately .002 inch clearance on either side of ring 40 whereby air passageways are provided from the mold cavity 20, via the sides of ring 40 and the chambered portions 83 and 84, to oversized bolt holes 85 in die block 22 and overside bolt holes 86 in backing block 60 to the exterior. Bolts 87 in the tapered portion of bolt holes 85 permit the air to pass therethrough, even though the bolt head of bolt 87 is seated.

In operation, the mold segments 12 and 13 are mounted in alignment, as illustrated in FIG. 1, and the machine actuated. This actuation causes the nozzle 10 to eject a prescribed amount of plastic between the die segments 12 and 13. Thereafter, the actuation of the machine causes the dies to close on the plastic parison 11 formed thereby and air introduced through nozzle 14 causes the plastic to be blown to the extremities of the cavity formed, as the pinching ring 30 and walls 31 pinch the plastic together. Also, the inward movement of die segments 12 and 13 move the posts, such as post 25 together to crest the central hole in the plastic.

When the die segments 12 and 13 move apart, the excess plastic is trimmed from the resulting shell.

It will be obvious to those skilled in the art that many variations may be made in the embodiments chosen for the purpose of illustrating the present invention, without departing from the scope thereof as defined by the appended claims.

I claim:
1. In a mold for hollow plastic discs of the type suitable as shells for weights of a barbell set, the combination of a pair of main die blocks each defining a portion of a mold cavity and a centrally positioned aperture, a removable interlock insert positioned in said aperture and having a central post for forming the central hole of said shells, the insert having raised areas separated by lower areas radiating from the central post, an annular engraving means removably carried by each of said blocks, said engraving means each being disposed outwardly of their said interlock insert, and means for fixing the position of said annular engraving means with respect to said die block and with respect to said insert for positioning indicia on said engraving means properly with respect to both said die block and said insert.

2. In a mold assembly for the blow molding of hollow plastic discs of the type suitable as shells for weights of a barbell set, the combination of a pair of facing main die blocks each having a sprue, a pincher ring communicating with said sprue, each of said blocks defining inwardly of its pincher ring a portion of a mold cavity and an aperture positioned centrally of said cavity, an interlock insert removably positioned in said aperture having a central post for defining the central hole of said shells, said insert having raised areas separated by lower areas radiating from the central post, liquid cooling conduits defined in said block and said insert, an engraving ring removably recessed in said cavity, said engraving ring being concentrically disposed outwardly of said interlock insert, and air ducts defined in said block communicating with said engraving ring for the egress of air from the mold assembly.

3. In a mold for the blow molding of hollow plastic discs of the type suitable as shells for weights of a barbell set, the combination of a main die block having on one side a sprue, a pincher ring communicating with said sprue, said block defining inwardly of said pincher ring a portion of a mold cavity, a central removable interlock insert having a central post for defining the central hole of said shells, said insert having raised areas separated by lower areas radiating from the central post, means for cooling said insert, means for cooling said block, a removable engraving ring recessed in said block, said engraving ring being concentrically disposed outwardly of said interlock insert, said means for cooling said block including partitions on the other side of said block defining a passageway for coolant from the exterior into the interior of said mold, said means for cooling said insert including means defining a separate passageway for coolant, said block having oversize bolt holes therein leading to the recess of said ring, and bolts in said bolt holes securing said ring in place, there being provided in said block a passageway, including said bolt holes for the egress of air from the vicinity of said ring.

4. Molding apparatus for blow molding hollow annular-shaped bodies comprising: a pair of casting assemblies of similar configuration and movable into engagement with each other to define molding cavities, each of said casting assemblies comprising:
a backing plate,
a die block connected to said backing plate defining an engaging surface for engaging the other casting assembly, a casting cavity and an opening extending through said casting cavity,
a removable insert positioned in said opening and connected to said backing plate, said insert including an engaging surface for engaging the other casting assembly,
a removable engraving ring seated in said casting cavity and surrounding the opening of said die block,
said die block including openings extending from its surface adjacent said backing plate to said engraving ring,
connecting means of smaller cross sectional area than said openings extending from said backing plate through at least some of said openings to said engraving ring to connect said engraving ring to said die block in such a manner that air can pass from said casting cavity through the openings of said die block, and
said die block and said insert each defining internal cooling conduits.

5. The invention of claim 2 and further including connecting members extending through at least some of the air ducts of each of said blocks for securing the engraving rings of each block with respect to its block.

6. The invention of claim 2 wherein the liquid cooling conduits defined in each of said main die blocks include a first passageway remotely positioned from said cavity and constructed to flow liquid in a first direction about the mold cavity and a second passageway communicating with the first passageway positioned between the first passageway and the mold cavity and constructed to flow liquid in a direction generally opposite to said first direction about the mold cavity, whereby liquid flows first through said first passageway and then through said second passageway.

References Cited

UNITED STATES PATENTS

| | | | |
|---|---|---|---|
| 267,659 | 11/1882 | Atterbury | 249—144 X |
| 2,003,151 | 5/1935 | Lang | 249—144 X |
| 2,541,249 | 2/1951 | Hobson | 18—5 X |
| 2,601,700 | 7/1952 | Pinsky et al. | |
| 2,611,170 | 9/1952 | Theis | 18—34 X |
| 2,792,593 | 5/1957 | Hardgrove | 18—5 X |
| 2,834,989 | 5/1958 | Kusnery | 18—2 X |
| 2,982,997 | 5/1961 | Peickii et al. | 18—42 |
| 3,078,508 | 2/1963 | Martin | 18—5 X |
| 3,094,758 | 6/1963 | Downie et al. | 18—34 X |
| 3,108,329 | 10/1963 | Chapman | 18—34 X |
| 3,108,339 | 10/1963 | Bucy | 18—42 X |
| 3,191,225 | 6/1965 | Polka | 18—5 |

FOREIGN PATENTS

| | | | |
|---|---|---|---|
| 1,295,454 | 5/1962 | France | 18—42 |
| 1,494 | 4/1879 | Great Britain | 249—103 |

OTHER REFERENCES

Tenite booklet, A Thermoplastic Molding Material Made from Eastman Cellulose Acetate, page 42, edition 3A, copyright 1936; Eastman Chemical Products, Inc., copy 18/42 D in Group 322.

J. HOWARD FLINT, JR., *Primary Examiner.*